(12) United States Patent
Yin et al.

(10) Patent No.: US 9,451,204 B2
(45) Date of Patent: Sep. 20, 2016

(54) HIGH-DEFINITION DIGITAL VIDEO SIGNAL TRANSMISSION METHOD AND DEVICE, CAMERA AND ACQUISITION DEVICE

(71) Applicant: ZHEJIANG DAHUA TECHNOLOGY CO., LTD, Hangzhou (CN)

(72) Inventors: Jun Yin, Hangzhou (CN); Zhicheng Ye, Hangzhou (CN); Bingyun Lv, Hangzhou (CN); Xingming Zhang, Hangzhou (CN); Liquan Fu, Hangzhou (CN); Jiangming Zhu, Hangzhou (CN); Jun Wu, Hangzhou (CN); Jian Wu, Hangzhou (CN)

(73) Assignee: ZHEJIANG DAHUA TECHNOLOGY CO., LTD, Hangzhou (CN)

(*) Notice: Subject to any disclaimer, the term of this patent is extended or adjusted under 35 U.S.C. 154(b) by 0 days.

(21) Appl. No.: 14/391,554
(22) PCT Filed: May 16, 2013
(86) PCT No.: PCT/CN2013/075722
§ 371 (c)(1),
(2) Date: Oct. 9, 2014
(87) PCT Pub. No.: WO2013/170766
PCT Pub. Date: Nov. 21, 2013

(65) Prior Publication Data
US 2015/0077631 A1    Mar. 19, 2015

(30) Foreign Application Priority Data
May 16, 2012   (CN) .......................... 2012 1 0153934

(51) Int. Cl.
*H04N 5/38*   (2006.01)
*H04N 7/01*   (2006.01)
(Continued)

(52) U.S. Cl.
CPC .............. *H04N 7/0125* (2013.01); *H04N 5/40* (2013.01); *H04N 7/015* (2013.01); *H04N 11/002* (2013.01); *H04N 11/20* (2013.01); *H04N 7/007* (2013.01)

(58) Field of Classification Search
CPC ...... H04N 7/0125; H04N 7/015; H04N 5/40; H04N 5/44; H04N 5/4401; H04N 5/23292; H04N 5/37455; H04N 7/01; H04N 5/278; H04N 13/0217; H04N 19/44; H04N 19/46; H04N 19/52; H04N 19/80
USPC .......................... 348/441, 723, 569, 458, 445
See application file for complete search history.

(56) References Cited

U.S. PATENT DOCUMENTS 3,941,919 A    3/1976  Baker
4,081,827 A *  3/1978  Hipwell ................... H04N 9/86
                                                        348/455

(Continued)

FOREIGN PATENT DOCUMENTS

CN            1079095        12/1993
CN           201118807        9/2008
(Continued)

*Primary Examiner* — Trang U Tran
(74) *Attorney, Agent, or Firm* — Harness, Dickey & Pierce, P.L.C.

(57) ABSTRACT

Disclosed are a high-definition digital video signal transmission method and device, a high-definition digital video camera and a video acquisition device. The technical solution provided in the embodiments of the present invention comprises: transcoding a high-definition digital video signal in accordance with a line-by-line sequence at a sending end to obtain an analogue video line signal, and sending analogue video line data which is obtained by conversion; and receiving the analogue video line data at a receiving end, and conducting decoding conversion on the received analogue video line data to obtain high-definition digital video line data. The present invention can convert a high-definition digital video signal into an analogue video signal to conduct transmission, thereby being able to solve the problem that a high-definition digital video signal cannot be transmitted for a long distance in the existing high-definition digital video monitoring technology.

12 Claims, 9 Drawing Sheets

(51) Int. Cl.
*H04N 11/24* (2006.01)
*H04N 5/40* (2006.01)
*H04N 7/015* (2006.01)
*H04N 11/20* (2006.01)
*H04N 7/00* (2011.01)

(56) References Cited

U.S. PATENT DOCUMENTS

| | | |
|---|---|---|
| 5,053,860 A | 10/1991 | Tsinberg |
| 5,136,381 A | 8/1992 | Citta et al. |
| 6,751,256 B1 | 6/2004 | Nickel |
| 7,099,388 B2 | 8/2006 | Cooper |
| 2011/0272675 A1 | 11/2011 | Chung et al. |

FOREIGN PATENT DOCUMENTS

| | | |
|---|---|---|
| CN | 201160296 | 12/2008 |
| CN | 101860758 | 10/2010 |
| CN | 102724519 | 10/2012 |
| JP | 2001-258046 | 9/2001 |
| JP | 2008-205897 | 9/2008 |
| KR | 10-0200702 | 6/1999 |
| KR | 10-2001-0088236 | 9/2001 |
| KR | 10-2007-0070466 | 7/2007 |

\* cited by examiner

HIGH-DEFINITION DIGITAL VIDEO SIGNAL TRANSMISSION METHOD AND DEVICE, CAMERA AND ACQUISITION DEVICE

CROSS-REFERENCE TO RELATED APPLICATIONS

This application is a U.S. National Stage of International Application No. PCT/CN2013/075722, filed on 16 May 2013, designating the United States, and claiming priority from Chinese Patent Application No. 201210153934.X, filed with the Chinese Patent Office on May 16, 2012 and entitled "High-definition digital video signal transmission method and device, camera and acquisition device", which is hereby incorporated by reference in its entirety.

FIELD OF THE INVENTION

The present invention relates to the video data field and particularly to a method and device for sending a high-definition digital video signal, a method and device for receiving a high-definition digital video signal, a high-definition digital video camera and a video acquisition device.

BACKGROUND OF THE INVENTION

At present, the high-definition video monitoring technology has gradually become a popular application in the security prevention monitoring industry, where the application scenarios include urban monitoring, road monitoring, large business district monitoring, industrial district monitoring and the like.

High-definition digital video signals are generally transmitted at present in a transmission scheme of Video Graphics Array (VGA). With the transmission scheme of VGA, RGB (i.e., red, green and blue) signals in the original high-definition digital video signal are modulated in a frequency range of a video baseband signal and then transmitted respectively over three coaxial cables. However in this transmission scheme, the loss of signal transmission increases when the transmission distance becomes longer, thus making it more difficult to synchronize the RGB signals and degrading the image quality, so that the high-definition digital video signals can not be transmitted for a long distance.

Apparently there is a problem that the high-definition digital video signals can not be transmitted for a long distance in the existing high-definition digital video monitoring technology.

SUMMARY OF THE INVENTION

In view of this, an embodiment of the invention provides a high-definition digital video signal transmission method so as to address the problem that the transmission distance is short in the existing high-definition digital video monitoring technology.

Correspondingly, embodiments of the invention further provide a high-definition digital video signal transmission device, a high-definition digital video camera and a video acquisition device.

Technical solutions according to the embodiments of the invention are as follows:

A method for sending a high-definition digital video signal includes: encoding the high-definition digital video signal in a line-by-line sequence to obtain digital modulated line signals; converting the digital modulated line signals into analog video line signals; and sending the analog video line signals.

A device for sending a high-definition digital video signal includes: an encoding unit configured to encode the high-definition digital video signal in a line-by-line sequence to obtain digital modulated line signals; a converting unit configured to convert the digital modulated line signals obtained by the encoding unit into analog video line signals; and a sending unit configured to send the analog video line signals obtained by the converting unit.

A high-definition digital video camera includes the device for sending a high-definition digital video signal as described above.

A method for receiving a high-definition digital video signal includes: receiving analog video line signals; converting the received analog video line signals into digital modulated line signals; and decoding the digital modulated line signals to obtain high-definition digital video line signals.

A device for receiving a high-definition digital video signal includes: a receiving unit configured to receive analog video line signals; a converting unit configured to convert the analog video line signals received by the receiving unit into digital modulated line signals; and a decoding unit configured to decode the digital modulated line signals obtained by the converting unit to obtain high-definition digital video line signals.

A video acquisition device includes the device for receiving a high-definition digital video signal as described above.

With the technical solutions according to the embodiments of the invention, the sending end encodes and converts the high-definition digital video signal in the line-by-line sequence to obtain the analog video line signals, and sends the analog video line signals obtained by the encoding and converting operations; and the receiving end receives the analog video line signals, and converts and decodes the received analog video line signals to obtain the high-definition digital video line signals, so that the high-definition digital video signal can be converted into the analog video signal for transmission to thereby address the problem that the high-definition digital video signal can not be transmitted for a long distance in the existing high-definition digital video monitoring technology.

Other features and advantages of the invention will be explained in the following description, and partially become apparent from the description or can be learned by implementing the invention. The objects and the other advantages of the invention can be achieved and obtained in the structures particularly pointed out in the written description, the claims and the drawings.

DETAILED DESCRIPTION OF THE EMBODIMENTS

Figure 1:
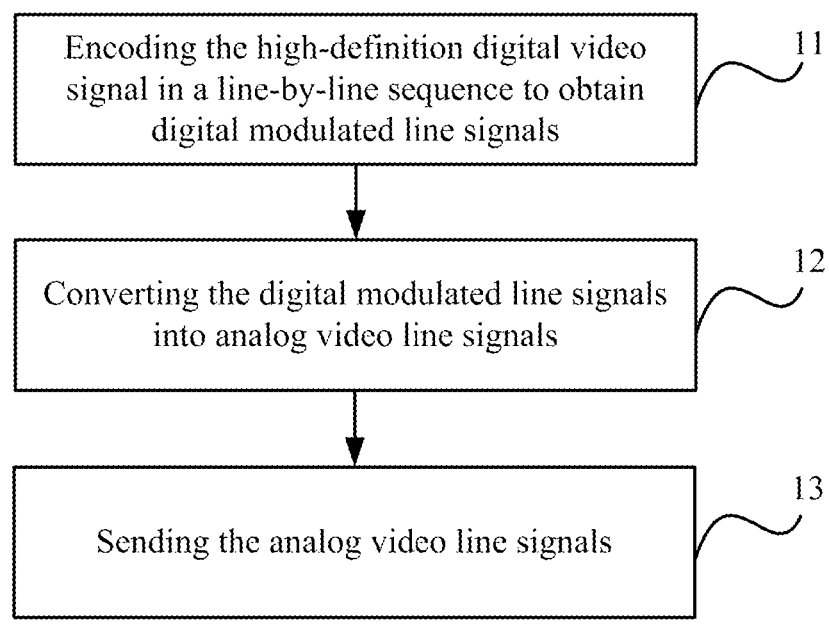
FIG. 1 is an operational flow chart of a method for sending a high-definition digital video signal according to an embodiment of the invention.

Embodiments of the invention will be described below with reference to the drawings, and it shall be appreciated that the embodiments described herein are merely used to describe and explain the invention but not to limit the invention.

In view of the problem that the transmission distance of the high-definition digital video signal is short in the existing high-definition digital video monitoring technology, the embodiments of the invention propose a transmission solution for the high-definition digital video signal so as to address this problem.

In the technical solution according to the embodiments of the invention, the sending end encodes and converts the high-definition digital video signal in the line-by-line sequence to obtain the analog video line signals, and sends the analog video line signals obtained by the encoding and converting operations; and the receiving end receives the analog video line signals, and converts and decodes the received analog video line signals to obtain the high-definition digital video line signals, so that the high-definition digital video signal can be converted into the analog video signal for transmission to thereby address the problem that the high-definition digital video signal can not be transmitted for a long distance in the existing high-definition digital video monitoring technology.

In a preferred implementation solution of the embodiments of the invention, in the sending end, data in a high-definition digital video frame is tailored to reserve data points in an active area and a part of data points in the column direction in a blank area, and for any line of data in the tailored frame of data, a brightness signal is normalized to obtain a brightness modulated signal and a component chrominance signal is modulated at a carrier frequency higher than the frequency of a video baseband signal to obtain a chrominance modulated signal, and the chrominance modulated signal and the brightness modulated signal are superimposed and converted into an analog video line signal; and since the analog video signal is obtained by the converting operation based on the high-definition digital video data reserving the data in the active area, the isolation, resolution and definition of the chrominance signal and the brightness signal can be enhanced on the basis of reserving the high-definition characteristic of the video data, and since the amount of data of the original high-definition digital video is lowered, the occupied transmission bandwidth can be lowered to thereby accommodate the long-distance transmission so that the line signals of the original high-definition digital video can be converted into the analog video line signals with the high-definition characteristic for transmission. In the receiving end, the received analog video signal is digitalized to obtain a digital modulated signal which is then lower-pass and band-pass filtered to obtain the brightness modulated signal and the chrominance modulated signal, the difference value calculation is performed on the chrominance modulated signal by using a chrominance secondary carrier to obtain a chrominance envelope signal, and the brightness modulated signal and the chrominance envelope signal are smoothed respectively to obtain the digital brightness signal and chrominance signal, so that the received analog video line signals can be recovered into the high-definition digital video line signals. Thus the problem that the transmission distance is short in the existing high-definition digital video monitoring technology can be addressed in the technical solution according to the embodiments of the invention.

The technical solution according to the embodiments of the invention will be described below in details.

(I) An embodiment of the invention firstly provides a method for encoding and sending a high-definition digital video signal at the sending end.

FIG. 1 illustrates an operational flow chart of a method for sending a high-definition digital video signal according to an embodiment of the invention, and as illustrated in FIG. 1, the method includes the following process flow:

Step 11, encoding the high-definition digital video signal in a line-by-line sequence to obtain digital modulated line signals;

Step 12, converting the digital modulated line signals into analog video line signals; and Step 13, sending the analog video line signals.

With the processing flow described above, the sending end performs the encoding operation and digital-to-analog converting operation on the high-definition digital video signal to obtain the analog video line signals and sends the analog video line signals, so that the high-definition digital video signal can be converted into the analog video signal for transmission to thereby address the problem that the high-definition digital video signal can not be transmitted for a long distance in the existing high-definition digital video monitoring technology.

The embodiment of the invention provides two preferred implementations of the method illustrated in FIG. 1.

First solution: phase inversion solution

In this solution, a chrominance signal, an initial phase of an analog data frame and a phase of a chrominance secondary carrier are phase-inverted respectively line by line so that the receiving end can identify the chrominance signal, the initial phase of the analog data frame and the phase of the chrominance secondary carrier easily.

Figure 2:
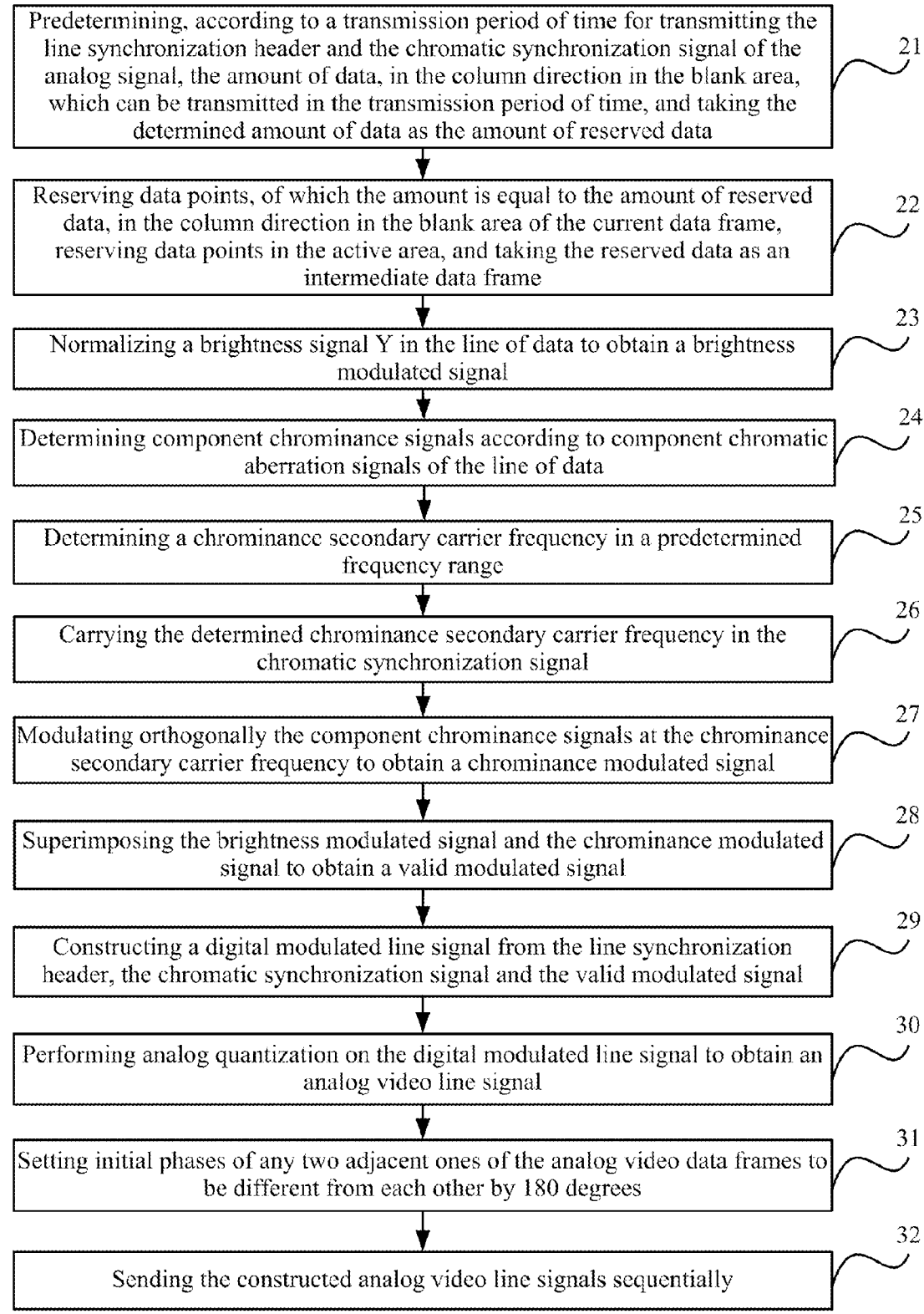
FIG. 2 is an operational flow chart of a preferred implementation of the method illustrated in FIG. 1.

FIG. 2 illustrates an operational flow chart of a preferred implementation of the method illustrated in FIG. 1, and as illustrated in FIG. 2, the preferred implementation includes the following process flow:

Step 21, predetermining, according to a transmission period of time for transmitting the line synchronization header and the chromatic synchronization signal of the analog signal, the amount of data, in the column direction in the blank area, which can be transmitted in the transmission period of time, and taking the determined amount of data as the amount of reserved data.

Step 22, reserving, for the current high-definition digital video data frame to be processed, data points, of which the amount is equal to the amount of reserved data, in the column direction in the blank area of the current data frame, reserving data points in the active area, and taking the reserved data as an intermediate data frame.

Step 23, normalizing, for each line of data in the intermediate data frame, a brightness signal Y in the line of data to obtain a brightness modulated signal Y'.

Step 24, determining a blue component chrominance signal U and a red component chrominance signal V according to the brightness signal Y, a blue component chromatic aberration signal Cb and a red component chromatic aberration signal Cr of the line of data, and particularly, determining the component chrominance signals UV in the following equations (1) to (5):

$$Cb = -0.172R' - 0.339G' + 0.511B' + 128 \quad (1)$$

$$Cr = 0.511R' - 0.428G' - 0.083B' + 128 \quad (2)$$

$$Y = 0.299R' + 0.587G' + 0.114B' \quad (3)$$

$$U = 0.492(B' - Y) \quad (4)$$

$$V = 0.877(R' - Y) \quad (5)$$

Step 25, determining a chrominance secondary carrier frequency fsc in a predetermined frequency range higher than the frequency of a video baseband signal, and particularly, determining randomly a frequency in the predetermined frequency range as the chrominance secondary carrier frequency fsc or determining a predetermined empirical frequency in the predetermined frequency range as the chrominance secondary carrier frequency fsc.

Particularly, the frequency range of the video baseband signal includes: a frequency range from 0 to 15 MHz of a video baseband signal for the high-definition digital video signal in a 720p format (i.e., scanning line by line for 720 lines) and a frequency range from 0 to 32 MHz of a video baseband signal for the high-definition digital video signal in a 1080p format (i.e., scanning line by line for 1080 lines); the predetermined frequency range for the high-definition digital video signal in the 720p format is from 13.5 to 21 MHz, and the predetermined frequency range for the high-definition digital video signal in the 1080p format is from 20 to 45 MHz; and the predetermined bandwidth of the chrominance secondary carrier for the high-definition digital video signal in the 720p format is from 4 to 6 MHz, and the predetermined bandwidth of the chrominance secondary carrier for the high-definition digital video signal in the 1080p format is from 8 to 14 MHz.

Step 26, carrying the determined chrominance secondary carrier frequency fsc in the chromatic synchronization signal, and particularly, taking the chrominance secondary carrier frequency as the frequency of the chromatic synchronization signal, taking a clock cycle of at least ten 1/fsc as the cycle of the chromatic synchronization signal, and carrying information about the chrominance secondary carrier frequency fsc in the chromatic synchronization signal at a phase different from a reference phase by +135 degrees or −135 degrees alternatively between any two adjacent lines of data.

Step 27, modulating orthogonally the determined blue component chrominance signal U and red component chrominance signal V at the determined chrominance secondary carrier frequency fsc to obtain a chrominance modulated signal C, and particularly, determining the chrominance modulated signal C in the equation (6):

$$C = U \sin(2\pi * fsc) \pm V \cos(2\pi * fsc) \quad (6)$$

That is, the component chrominance signals are modulated orthogonally by using C=U sin(2π*fsc)+V cos(2π*fsc) or C=U sin(2π*fsc)−V cos(2π*fsc) alternatively between any two adjacent lines of data to obtain the chrominance modulated signal.

Step 28, superimposing the brightness modulated signal Y' and the chrominance modulated signal C to obtain a valid modulated signal Vs, particularly Vs=Y'+C.

Step 29, constructing a digital modulated line signal from the line synchronization header, the chromatic synchronization signal and the valid modulated signal Vs.

Step 30, performing analog quantization on the digital modulated line signal to obtain an analog video line signal Va, and particularly, performing analog quantization on the digital modulated line signal at a conversion frequency greater than or equal to 80 MHz to obtain the analog video line signal Va; and particularly a high-definition digital video signal in 720p with 25 or 30 frames can be sampled at a sampling frequency of 108 MHz to obtain an analogy video signal at 1280H (i.e., 1280 columns of data per line), and a high-definition digital video signal in 1080p with 25 or 30 frames can be sampled at a sampling frequency of 220 MHz to obtain an analogy video signal at 1920H; or the high-definition digital video signal in 720p with 25 or 30 frames can alternatively be sampled at the frequency of 220 MHz.

Step 31, setting, for analog video data frames formed of several analog video line signals, initial phases of any two adjacent ones of the analog video data frames to be different from each other by 180 degrees.

Step 32, sending the constructed analog video line signals sequentially, and preferably, replacing the line synchronization headers and the data points in the blank areas in the analog video line signals with a direct-current level analog signal at a predetermined level amplitude and sending the replaced analog video line signals.

In the process flow described above, in the step 22, the data in the line direction of the high-definition digital video signal is reserved, so that the data can be decoded and then recovered into the data in the standard digital format at the receiving end, and a part of the data in the column direction in the blank area of the high-definition digital video signal can be removed to thereby lower the amount of data and the occupied transmission bandwidth.

In the step 25 described above, the frequency higher than the frequency range of the video baseband signal is selected as the chrominance secondary carrier frequency, and the brightness modulated signal and the chrominance modulated signal are modulated at different frequencies, so that the brightness modulated signal and the chrominance modulated signal can be isolated from each other, the definition of the chrominance signal and the brightness signal at the receiving end can be enhanced and the resolution of the decoded image can be improved as compared with the prior art where the chrominance signal and the brightness signal are modulated at 0 to 6 MHz.

In the step 26 described above, the chrominance secondary carrier frequency fsc is recorded in the chromatic synchronization signal at the phase different from the reference phase by +135 degrees or −135 degrees alternatively between any two adjacent lines of data to thereby enhance the separation of and the capability to parse the information about the chrominance secondary carrier frequency.

In the step 27 described above, the component chrominance signal V is phase-inverted line by line (i.e., the component chrominance signal V is modulated positively and negatively alternatively) between any two adjacent lines of data to thereby improve the resolution of the chrominance modulated signal C and avoid the problem of failing to parse the chrominance modulated signal C at the receiving end due to the overlapping of the chrominance modulated signal C as a result of the phase error arising from the modulation of the component chrominance signal V in the same mode.

In the step 30 described above, the analog quantization is performed on the valid digital signal Vs at the conversion frequency greater than or equal to 80 MHz, that is, the analog quantization is performed on the valid digital signal Vs at the conversion frequency higher than 27 MHz in the high-definition CVBS standard, to thereby reserve more digital data at the higher sampling frequency so as to reserve more high-definition characteristic.

In the step 32 described above, the initial phases of any two adjacent analog video frames are set to be different from each other by 180 degrees so that the transmitted analog video signal can be parsed effectively at the receiving end to thereby avoid the problem of failing to parse effectively the analog video signal at the receiving end due to the overlapping of two frames of data as a result of a phase error between the adjacent frames.

Apparently, in the process flow as illustrated in FIG. 2, the data in the high-definition digital video frame is tailored to reserve data points in the active area and a part of data points in the column direction in the blank area, and for any line of data in the tailored frame of data, a component chrominance signal is modulated at a frequency higher than the frequency of the video baseband signal to obtain a chrominance modulated signal, and the chrominance modulated signal and the normalized brightness modulated signal are superimposed, and a digital video modulated line signal is constructed, and analog sampling and quantization operations are performed on the digital video modulated line signal to obtain an analog video line signal, so that the original high-definition digital video signal can be converted into the analog video signal with the high-definition characteristic for transmission to thereby address the problem that the high-definition digital video signals can not be transmitted for a long distance in the existing high-definition digital video monitoring technology. Moreover, the analog video signal is obtained by the converting operation based on the high-definition digital video data reserving the data in the active area to thereby reserve the high-definition characteristic of the high-definition digital video signal and lower the amount of data to accommodate the long-distance transmission, and there is good isolation of the chrominance signal from the brightness signal in the analog video signal, and there is a good resolution between data frames, so that the receiving end can decode and convert the analog video signal to obtain the digital video signal easily.

Second Solution: Phase Continuity Solution

In this solution, the chrominance signal is continuous in phase, and the processing load at the sending end can be lowered as compared with the first solution.

In the process flow of the method for sending a high-definition digital video signal in the second solution, the process steps of determining an intermediate data frame, a brightness modulated signal, component chrominance signals and a chrominance secondary carrier are the same as the step 21 to the step 25 in the first solution, so the repeated description thereof will be omitted here.

The process step of determining a chrominance modulated signal includes: modulating orthogonally the determined blue component chrominance signal U and red component chrominance signal V at the determined chrominance secondary carrier frequency fsc to obtain the chrominance modulated signal C, and particularly, determining the chrominance modulated signal C in the equation (7):

$$C=U\sin(2\pi * fsc)+V\cos(2\pi * fsc) \qquad (7)$$

Moreover in the second solution, the subsequent process step of superimposing the brightness modulated signal and the chrominance modulated signal to obtain a valid modulated signal, constructing a digital modulated line signal from the line synchronization header, the chromatic synchronization signal and the valid modulated signal, performing analog quantification on the digital modulated line signal and sending analog video line data are the same as the step 28 to the step 30 and the step 32 in the first solution, so the repeated description thereof will be omitted here.

With the processing method in the second solution, the original high-definition digital video signal can also be converted into the analog video signal with the high-definition characteristic for transmission to thereby address the problem that the high-definition digital video signals can not be transmitted for a long distance in the existing high-definition digital video monitoring technology.

In a preferred implementation, an embodiment of the invention further provides a solution for hybrid transmission of a high-definition digital video signal and an audio signal based upon the method illustrated in FIG. 1.

The audio signal is frequency-modulated at a predetermined first frequency-modulation frequency to obtain a frequency-modulated audio signal, the frequency-modulated audio signal and the analog video line signals obtained in the method illustrated in FIG. 1 are superimposed to obtain a mixed signal, and the mixed signal is sent over a coaxial cable, where the predetermined first frequency-modulation frequency is a frequency in the range of 60 to 100 MHz. The mixed signal is sent over the coaxial cable to thereby decrease the number of transmission media to be laid out, lower the construction difficulty and save the construction cost.

Moreover, based upon the solution where only the high-definition digital video signal is sent or the solution where the audio signal and the high-definition digital video signal are sent in hybrid, management data can be sent or control data can be received over the coaxial cable in the embodiment of the invention.

In the case of sending the management data, the management data can be sent over the coaxial cable in a radio data broadcast system.

In the case of receiving the control data, the analog control data from a video acquisition device can be received over the coaxial cable, the analog control data is filtered by using a predetermined filter band to obtain frequency-modulated control data, the frequency-modulated control data is demodulated to obtain digital control data, and the digital control data is stored and/or configured, where the predetermined filter band is different from a second frequency-modulation frequency by ±100 KHz, the second frequency-modulation frequency is a frequency in the range of 60 to 100 MHz, and the difference between the first frequency-modulation frequency and the second frequency-modulation frequency is at least 600 KHz. The digital control data includes at least one of configuration parameters of the camera and an application strategy of the camera.

The management data is sent or the control data is received over the coaxial cable so that the communication between the high-definition digital camera acquiring the high-definition digital video signal and the video acquisition device can be achieved.

The method illustrated in FIG. 1 can be embodied in hardware or can be embodied in software program, that is, the high-definition digital video camera includes the following device for sending a high-definition digital video signal.

Figure 3:
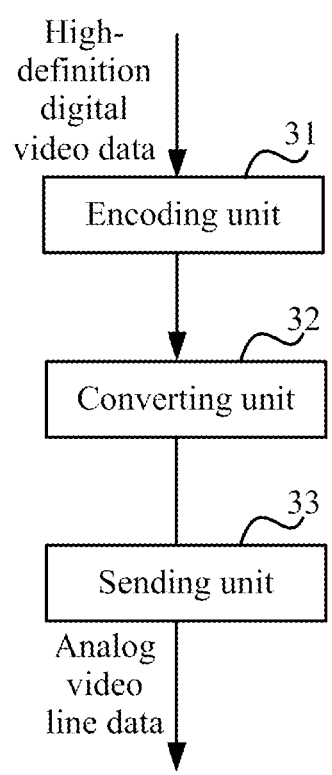
FIG. 3 is a structural block diagram of a device for sending a high-definition digital video signal according to an embodiment of the invention.

FIG. 3 illustrates a structural block diagram of a device for sending a high-definition digital video signal according to an embodiment of the invention, and as illustrated in FIG. 3, the device includes:

An encoding unit 31 is configured to encode the high-definition digital video signal in a line-by-line sequence to obtain digital modulated line signals;

A converting unit 32 is configured to convert the digital modulated line signals obtained by the encoding unit 31 into analog video line signals; and A sending unit 33 is configured to send the analog video line signals obtained by the converting unit 32.

The operating principle of the device illustrated in FIG. 3 is as illustrated in FIG. 1, so the repeated description thereof will be omitted here.

With the device as illustrated in FIG. 3, the sending end performs the encoding operation and digital-to-analog converting operation on the high-definition digital video signal to obtain the analog video line signals and sends the analog video line signals, so that the high-definition digital video signal can be converted into the analog video signal for transmission to thereby address the problem that the high-definition digital video signal can not be transmitted for a long distance in the existing high-definition digital video monitoring technology.

Figure 4:
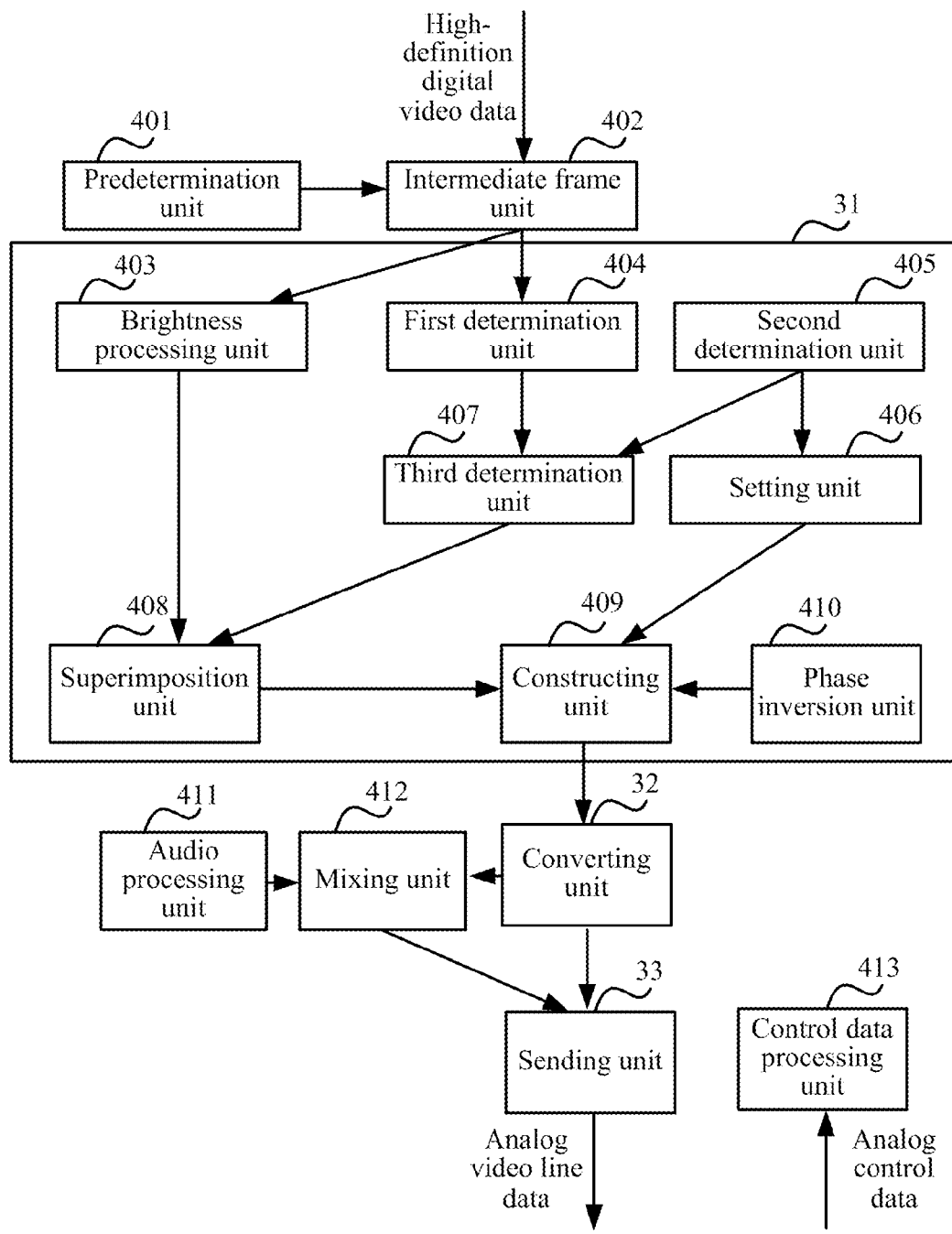
FIG. 4 is a structural block diagram of a preferred implementation of the device illustrated in FIG. 3.

FIG. 4 illustrates a structural block diagram of a preferred implementation of the device illustrated in FIG. 3, and as illustrated in FIG. 4, the device illustrated in FIG. 3 specifically includes:

A predetermination unit 401 is configured to predetermine, according to a transmission period of time for transmitting the line synchronization header and the chromatic synchronization signal, the amount of data, in the column direction in the blank area, which can be transmitted in the transmission period of time, and to take the determined amount of data as the amount of reserved data; and An intermediate frame unit 402 connected to the predetermination unit 401 is configured to reserve, for the current high-definition digital video data frame to be processed, data points in an active area and a part of data points in the column direction in a blank area in the data frame as an intermediate data frame, and particularly to reserve data points, of which the amount is equal to the amount of reserved data predetermined by the predetermination unit 401, in the column direction in the blank area in the current data frame according to the amount of reserved data.

The encoding unit 31 specifically includes:

A brightness processing unit 403 connected to the intermediate frame unit 402 is configured to normalize, for each line of data of the high-definition digital video signal, a brightness signal in the line of data to obtain a brightness modulated signal;

A first determination unit 404 is configured to determine component chrominance signals according to component chromatic aberration signals in the line of data, and for details thereof, reference can be made to the equations (1) to (5) described above;

A second determination unit 405 is configured to determine a chrominance secondary carrier frequency, and particularly to determine the chrominance secondary carrier frequency in a predetermined frequency range higher than a frequency range of a video baseband signal and in a predetermined bandwidth range; to determine randomly a frequency in the predetermined frequency range higher than the frequency of the video baseband signal as the chrominance secondary carrier frequency; or to determine a predetermined empirical frequency in the predetermined frequency range as the chrominance secondary carrier frequency;

A setting unit 406 connected to the second determination unit 405 is configured to carry the chrominance secondary carrier frequency determined by the second determination unit 405 in the chromatic synchronization signal, and particularly to take the chrominance secondary carrier frequency as the frequency of the chromatic synchronization signal, take a clock cycle of at least ten 1/fsc as the cycle of the chromatic synchronization signal, and to carry information about the chrominance secondary carrier frequency fsc in the chromatic synchronization signal at a phase different from a reference phase by +135 degrees or −135 degrees alternatively between any two adjacent lines of data;

A third determination unit 407 is configured to determine a chrominance modulated signal according to the component chrominance signals determined by the first determination unit 404 and the chrominance secondary carrier frequency determined by the second determination unit 405, and particularly to modulate orthogonally the component chrominance signals at the chrominance secondary carrier frequency to obtain the chrominance modulated signal, that is, to modulate orthogonally the component chrominance signals by using $C=U \sin(2\pi^*fsc)+V \cos(2\pi^*fsc)$ or $C=U \sin(2\pi^*fsc)-V \cos(2\pi^*fsc)$ alternatively between any two adjacent lines of data to obtain the chrominance modulated signal, where C is the chrominance modulated signal, U is a blue component chrominance signal among the component chrominance signals, V is a red component chrominance signal among the component chrominance signals, and fsc is the determined chrominance secondary carrier frequency; or to modulate orthogonally the component chrominance signals by using $C=U \sin(2\pi^*fsc)+V \cos(2\pi^*fsc)$ to obtain the chrominance modulated signal;

A superimposition unit 408 connected to the brightness processing unit 403 and the third determination unit 407 is configured to superimpose the brightness modulated signal determined by the brightness processing unit 403 and the chrominance modulated signal determined by the third determination unit 407 to obtain a valid modulated signal; and A constructing unit 409 connected to the setting unit 406 and the superimposition unit 408 is configured to construct a digital modulated line signal from the line synchronization header, the chromatic synchronization signal obtained by the setting unit 406 and the valid modulated signal obtained by the superimposition unit 408.

A phase inversion unit 410 is specifically configured to set, for analog video data frames formed of several analog video line signals obtained by the constructing unit 409, initial phases of any two adjacent ones of the analog video data frames to be different from each other by 180 degrees.

An audio processing unit 411 is configured to frequency-modulate an audio signal at a predetermined first frequency-modulation frequency to obtain a frequency-modulated audio signal and to superimpose the frequency-modulated audio signal and the analog video line signals to obtain a mixed signal.

A mixing unit 412 connected to the converting unit 32 and the audio processing unit 411 is configured to superimpose the frequency-modulated audio signal obtained by the audio processing unit 411 and the analog video line signals obtained by the converting unit 32 to obtain a mixed signal.

A control data processing unit 413 is configured to receive analog control data from a video acquisition device, to filter the analog control data by using a predetermined filter band to obtain frequency-modulated control data, to demodulate the frequency-modulated control data to obtain digital control data, and to store and/or configure the digital control data, where the digital control data includes at least one of configuration parameters of the camera and an application strategy of the camera.

Here the first frequency-modulation frequency and the predetermined filter band are as described above, so the repeated description thereof will be omitted here.

Moreover the converting unit 32 is specifically configured to perform analog quantization on the digital modulated line signals obtained by the encoding unit 31 at a conversion frequency greater than or equal to 80 MHz to obtain the analog video line signals; where the conversion frequency used particularly is as described above, so the repeated description thereof will be omitted here.

The sending unit 33 is specifically configured to replace the line synchronization header and the blank data points in the analog video line signals with a direct-current level analog signal at a predetermined level amplitude and to send the replaced analog video line signals; and further configured to send the mixed signal obtained by the mixing unit 412 over a coaxial cable; and/or to send the management unit over the coaxial cable in a radio data broadest system.

The operating principle of the device illustrated in FIG. 4 is as described in the method in the first solution or the second solution described above, so the repeated description thereof will be omitted here.

The high-definition digital video signal is processed to obtain the analog video line signals with the device illustrated in FIG. 4 to thereby reserve the high-definition characteristic of the high-definition digital video signal and lower the amount of data to accommodate the long-distance transmission; and there is good isolation of the chrominance signal from the brightness signal in the analog video signal, and there is a good resolution between data frames, so that the receiving end can decode and convert the analog video signal to obtain the digital video signal easily.

(II) An embodiment of the invention further provides a method for receiving and decoding a high-definition digital video signal at the receiving end.

Figure 5:
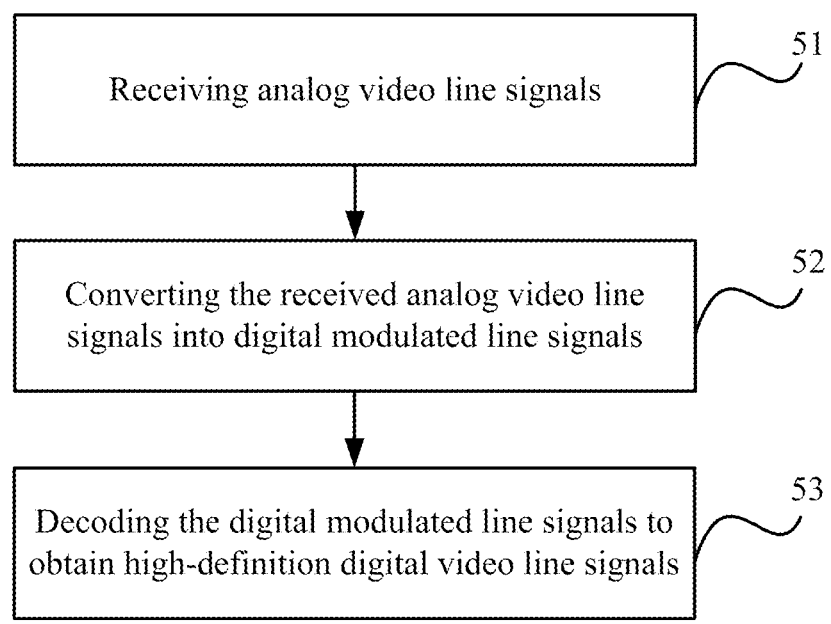
FIG. 5 is another operational flow chart of a method for receiving a high-definition digital video signal according to an embodiment of the invention.

FIG. 5 illustrates another operating flow chart of a method for receiving a high-definition digital video signal according to an embodiment of the invention, and as illustrated in FIG. 5, the method includes the following process flow:

Step 51, receiving analog video line signals;

Step 52, converting the received analog video line signals into digital modulated line signals; and Step 53, decoding the digital modulated line signals to obtain high-definition digital video line signals.

With the processing flow as illustrated in FIG. 5, the receiving end receives the analog video line signals and performs the analog-to-digital converting and decoding operations on the received analog video line signals to obtain the high-definition digital video line signals, to thereby address the problem that the high-definition digital video signals can not be transmitted for a long distance in the existing high-definition digital video monitoring technology.

The embodiment of the invention provides two preferred implementations of the method illustrated in FIG. 5.

Third Solution: Phase Inversion Solution

The third solution corresponds to the first solution described above, and a frame phase, a phase of a chrominance signal and a phase of a chrominance secondary carrier are identified at the receiving end.

Figure 6:
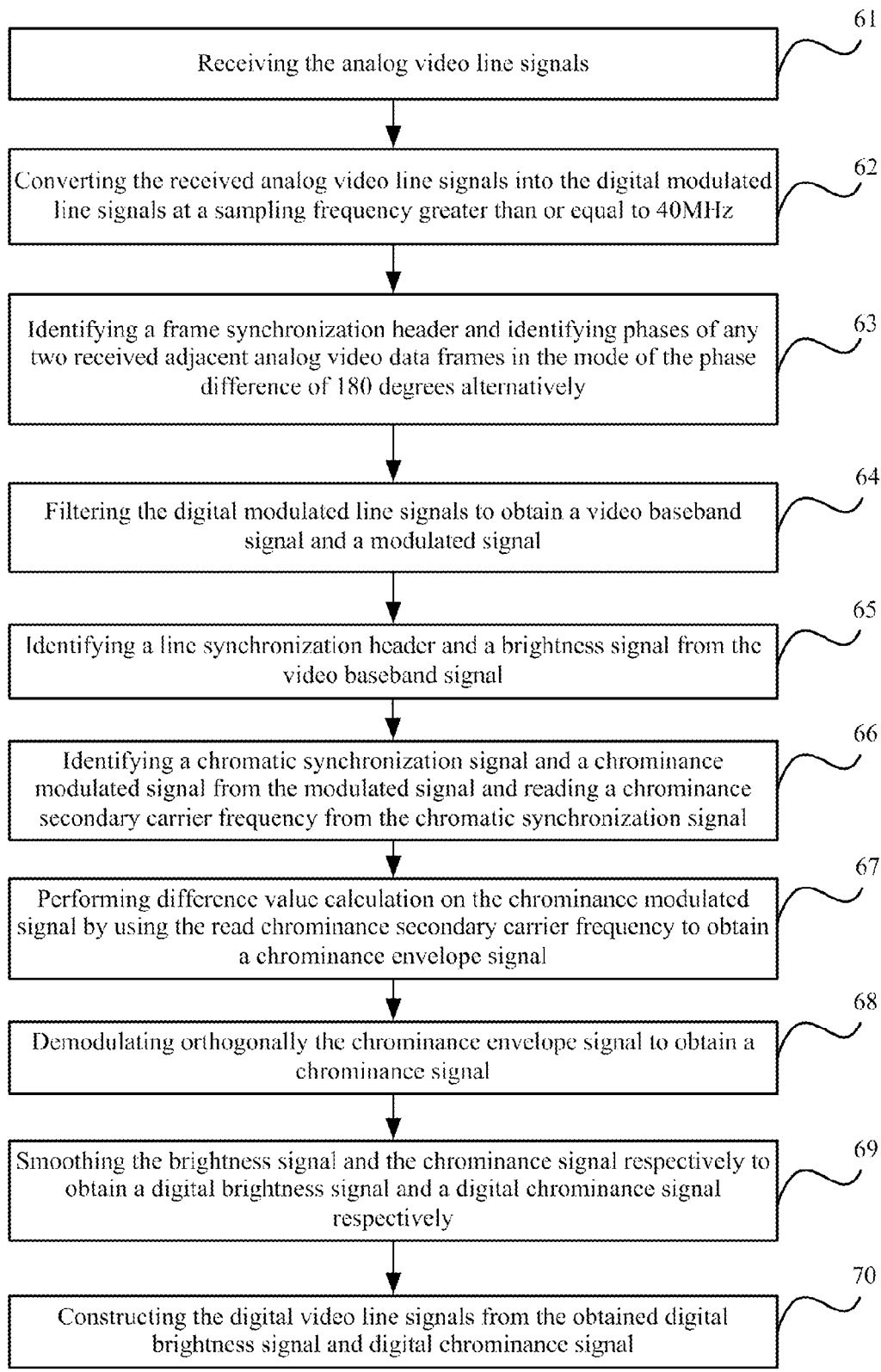
FIG. 6 is an operational flow chart of a preferred implementation of the method illustrated in FIG. 5.

FIG. 6 illustrates a preferred implementation of the method illustrated in FIG. 5, and this preferred implementation specifically includes:

Step 61, receiving the analog video line signals.

Step 62, converting the received analog video line signals into the digital modulated line signals at a sampling frequency greater than or equal to 40 MHz, that is, to convert the analog video line signals into the digital modulated line signals at a frequency which is half of the conversion frequency at the sending end, and particularly, sampling a received 1280H analog video signal at a sampling frequency down to 54 MHz or a received 1920H analog video signal at a sampling frequency down to 110 MHz.

Step 63, identifying a direct-current level signal at a predetermined level amplitude with a second predetermined time length from a plurality of received digital modulated line signals and taking the direct-current level signal at the predetermined level amplitude with the second predetermined time length, if any, as a frame synchronization header, where the second predetermined time length includes a second predetermined period of time for 1280H analog video line signals being a period of time for transmitting 25 lines of 1280H analog video line data and a second predetermined period of time for 1920H analog video line signals being a period of time for transmitting of 41 lines of 1920H analog video line data; and identifying phases of any two received adjacent analog video data frames in the mode of the phase difference of 180 degrees alternatively.

Step 64, filtering the digital modulated line signals to obtain a video baseband signal and a modulated signal, and particularly, low-pass filtering the digital modulated line signals to obtain the video baseband signal, where a low-pass filter range used for 1280H analog video line signals received is from 0 to 15 MHz, and a low-pass filter range used for 1920H analog video line signals received is from 0 to 32 MHz; and band-pass filtering the digital modulated line signals to obtain the modulated signal, where a band-pass filter range used for 1280H analog video line signals received is from 13.5 to 21 MHz, and a band-pass filter range used for 1920H analog video line signals received is from 20 to 45 MHz.

Step 65, identifying a line synchronization header and a brightness signal from the video baseband signal by identifying a direct-current level signal at a predetermined level amplitude with a first predetermined time length from the video baseband signal and taking the direct-current level signal at the predetermined level amplitude with the first predetermined time length, if any, as the line synchronization header; and identifying a signal except the identified line synchronization header in the video baseband signal as the brightness signal.

Step 66, identifying a chromatic synchronization signal and a chrominance modulated signal from the modulated signal and reading a chrominance secondary carrier frequency from the chromatic synchronization signal, and particularly, identifying a signal at a frequency fsc with a clock cycle of at least ten 1/fsc from the modulated signal as the chromatic synchronization signal and identifying a signal except the identified chromatic synchronization signal in the modulated signal as the chrominance modulated signal; reading a frequency fsc from the chromatic synchronization signal as the chrominance secondary carrier frequency in a mode of a phase difference of 180 degrees alternatively between any two adjacent lines of the modulated signal; and identifying a phase of the chrominance modulated signal in the mode of the difference of 180 degrees alternatively between any two adjacent lines of the modulated signal.

Step 67, performing difference value calculation on the chrominance modulated signal by using the read chrominance secondary carrier frequency to obtain a chrominance envelope signal.

Step 68, demodulating orthogonally the chrominance envelope signal to obtain a chrominance signal.

Step 69, smoothing the brightness signal and the chrominance signal respectively to obtain a digital brightness signal and a digital chrominance signal respectively.

Step 70, constructing the digital video line signals from the obtained digital brightness signal and digital chrominance signal.

With the process flow described above, based upon the method illustrated in FIG. 5, the receiving end low-pass and band-pass filters the received analog video signal with the high-definition characteristic respectively to thereby separate the brightness signal and the chrominance signal effectively, and the brightness signal and the chrominance signal are digitized to obtain the high-definition digital video signal at the high resolution and high definition, so the image quality is higher than that of an image of a normal digital video signal.

Fourth Solution: Phase Continuity Solution

The fourth solution corresponds to the second solution described above, and a chrominance signal which is continuous in phase is identified at the receiving end.

The differences of the method in the fourth solution from the method in the third solution includes: the initial phase of the analog data frame will not be identified, that is, the process of identifying the initial phase of the analog data frame in the step 63 is not performed, and the phase of the chrominance modulated signal is identified in the mode of Arctg phase discrimination in the step 66 without identifying the phase of the chrominance secondary carrier. Thus, as described above, the chrominance secondary carrier frequency is identified at the receiving end in the mode of Arctg phase discrimination to thereby alleviate the processing load of the sending end when the performing phase inversion.

With the method in the fourth solution, the receiving end can receive the high-definition digital video signal transmitted in the form of the analog video signal, and decodes and converts the received analog video line data to obtain the high-definition digital video line data to thereby address the problem that the high-definition digital video signals can not be transmitted for a long distance in the existing high-definition digital video monitoring technology.

In a preferred implementation, an embodiment of the invention provides a solution for receiving a mixed signal consisted of a high-definition digital video signal and an audio signal based upon the method illustrated in FIG. 5.

Particularly, the receiving end receives the mixed signal over a coaxial cable, filters the mixed signal by using a predetermined filter band to obtain the analog video line signals and a frequency-modulated audio signal, demodulates the frequency-modulated audio signal to obtain an audio signal, and processes the analog video line signals by using the method as described in FIG. 5, where the filter band is a frequency range different from a predetermined first frequency-modulation frequency by ±500 KHz, and the predetermined first frequency-modulation frequency is a frequency in the range of 60 to 100 MHz.

As described above, the mixed signal consisted of the high-definition digital video signal and the audio signal is received over the coaxial cable to thereby decrease the number of transmission media to be laid out, lower the construction difficulty and save the construction cost.

Moreover, based upon the solution where only the analog video line signals are received or the solution where the mixed signal consisted of the high-definition digital video signal and the audio signal is received, management data can be received or control data can be sent over the coaxial cable in the embodiment of the invention.

The management data received over the coaxial cable includes at least one of an identifier of a camera, attribute of the camera and an alarm signal.

In the case of sending the control data over the coaxial cable, digital control data is modulated at a predetermined second frequency-modulation frequency to obtain analog control data, the analog control data is coupled onto the coaxial cable and the analog control data is sent over the coaxial cable, where the digital control data includes at least one of configuration parameters of the camera and an application strategy of the camera.

Here the second frequency-modulation frequency is a frequency in the range of 60 to 100 MHz, and the difference between the first frequency-modulation frequency and the second frequency-modulation frequency is at least 600 KHz.

The management data is received or the control data is sent over the coaxial cable so that the communication between the high-definition digital camera acquiring the high-definition digital video signal and the video acquisition device can be achieved.

The method for receiving the high-definition digital video signal illustrated in FIG. 5 can be embodied in hardware or can be embodied in software program, that is, the video acquisition device includes the following device for receiving a high-definition digital video signal.

Figure 7:
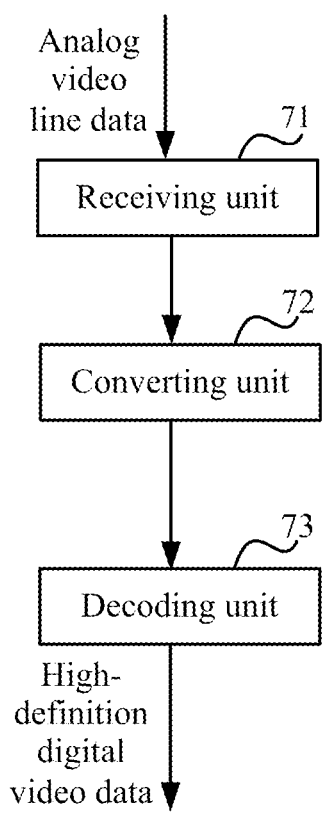
FIG. 7 is another structural block diagram of a device for receiving a high-definition digital video signal according to an embodiment of the invention.

FIG. 7 illustrates a structural block diagram of a device for receiving a high-definition digital video signal according to an embodiment of the invention, and as illustrated in FIG. 7, the device includes:

A receiving unit 71 is configured to receive analog video line signals;

A converting unit 72 connected to the receiving unit 71 is configured to convert the analog video line signals received by the receiving unit 71 into digital modulated line signals; and A decoding unit 73 connected to the converting unit 72 is configured to decode the digital modulated line signals obtained by the converting unit 72 to obtain high-definition digital video line signals.

With the device as illustrated in FIG. 7, the receiving end receives the analog video line signals and performs the analog-to-digital converting and decoding operations on the received analog video line signals to obtain the high-definition digital video line signals, to thereby address the problem that the high-definition digital video signals can not be transmitted for a long distance in the existing high-definition digital video monitoring technology.

Figure 8:
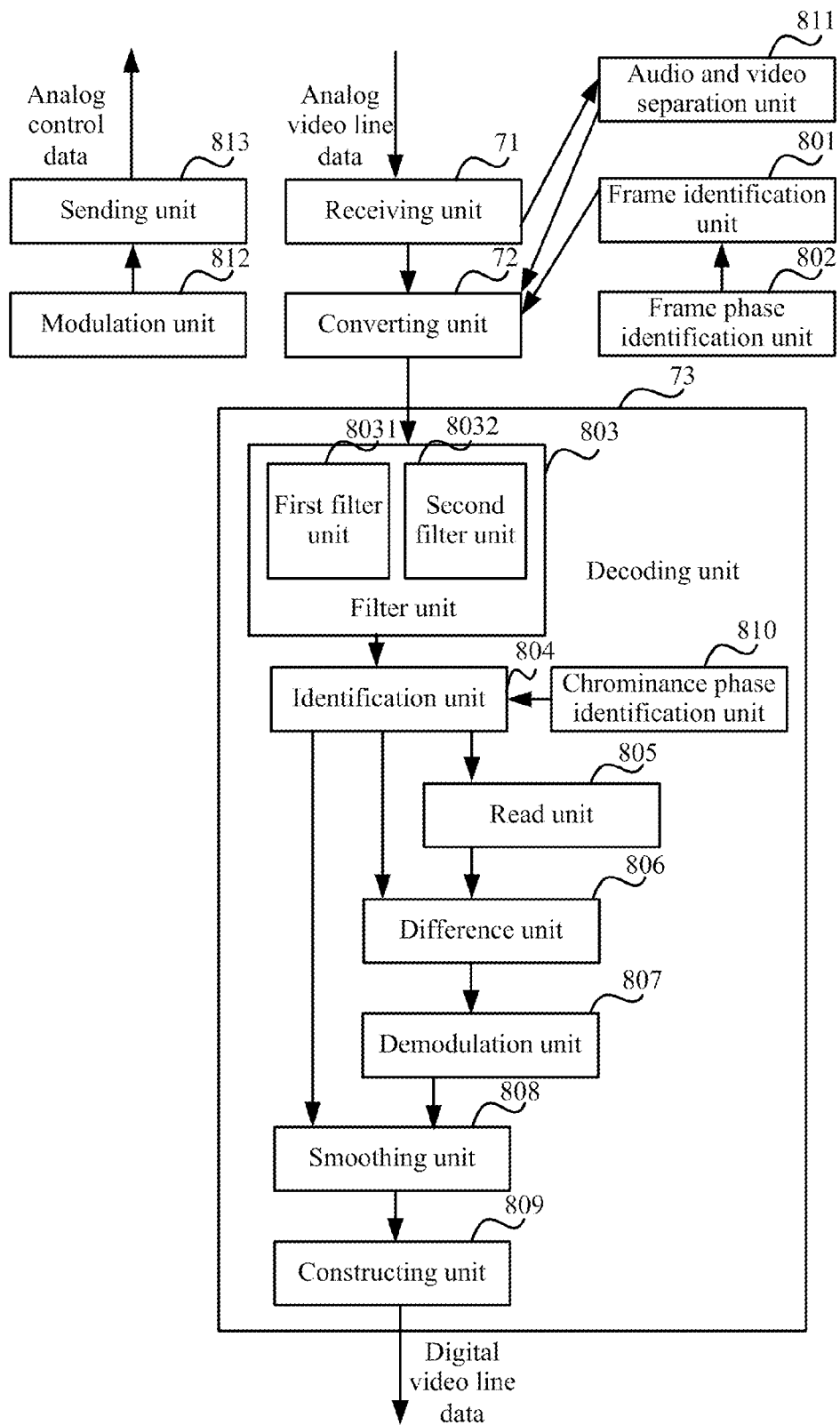
FIG. 8 is a structural block diagram of a preferred implementation of the device illustrated in FIG. 7.

FIG. 8 illustrates a preferred structure of the device as illustrated in FIG. 7, and as illustrated in FIG. 8, the preferred structure is as follows:

The converting unit 72 is specifically configured to convert the analog video line signals into the digital modulated line signals at a sampling frequency greater than or equal to 40 MHz.

A frame identification unit 801 connected to the converting unit 72 is configured to identify a direct-current level signal at a predetermined level amplitude with a second predetermined time length from a plurality of received digital modulated line signals and to take the direct-current level signal at the predetermined level amplitude with the second predetermined time length, if any, as a frame synchronization header, where the second predetermined time length includes a second predetermined period of time for 1280H analog video line signals being a period of time for transmitting 25 lines of 1280H analog video line data and a second predetermined period of time for 1920H analog video line signals being a period of time for transmitting of 41 lines of 1920H analog video line data.

A frame phase identification unit 802 connected to the frame identification unit 801 is configured to identify phases of any two adjacent analog video data frames identified by the frame identification unit 801 in the mode of the phase difference of 180 degrees alternatively, where one analog video data frame is consisted of several analog video line signals.

The decoding unit 73 specifically includes:

A filter unit 803 is configured to filter the digital modulated line signals to obtain a video baseband signal and a modulated signal, and specifically includes: a first filter unit 8031 configured to low-pass filter the digital modulated line signals to obtain the video baseband signal, where a low-pass filter range used for 1280H analog video line signals received is from 0 to 15 MHz, and a low-pass filter range used for 1920H analog video line signals received is from 0 to 32 MHz; and a second filter unit 8032 configured to band-pass filter the digital modulated line signals to obtain the modulated signal, where a band-pass filter range used for 1280H analog video line signals received is from 13.5 to 21 MHz, and a band-pass filter range used for 1920H analog video line signals received is from 20 to 45 MHz;

An identification unit 804 is configured to identify a line synchronization header and a brightness signal from the video baseband signal obtained by the filter unit 803 particularly by identifying a direct-current level signal at a predetermined level amplitude with a first predetermined time length from the video baseband signal and taking the direct-current level signal at the predetermined level amplitude with the first predetermined time length, if any, as the line synchronization header, and identifying a signal except the identified line synchronization header in the video baseband signal as the brightness signal; and the identification unit 804 is configured to identify a chromatic synchronization signal and a chrominance modulated signal from the modulated signal particularly by identifying a signal at a frequency fsc with a clock cycle of at least ten 1/fsc from the modulated signal as the chromatic synchronization signal, and identifying a signal except the identified chromatic synchronization signal in the modulated signal as the chrominance modulated signal;

A read unit 805 is configured to read a chrominance secondary carrier frequency from the chromatic synchronization signal identified by the identification unit 804 particularly by reading a frequency fsc from the chromatic synchronization signal as the chrominance secondary carrier frequency in a mode of a phase difference of 180 degrees alternatively between any two adjacent lines of the modulated signal;

A difference unit 806 is configured to perform difference value calculation on the chrominance modulated signal identified by the identification unit by using the chrominance secondary carrier frequency read by the read unit 805 to obtain a chrominance envelope signal;

A demodulation unit 807 is configured to demodulate orthogonally the chrominance envelope signal obtained by the difference unit 806 to obtain a chrominance signal;

A smoothing unit 808 is configured to smooth the brightness signal identified by the identification unit 802 and the chrominance signal obtained by the demodulation unit 805 respectively to obtain a digital brightness signal and a digital chrominance signal respectively; and A constructing unit 809 is configured to construct the digital video line signals from the digital brightness signal and the digital chrominance signal obtained by the smoothing unit 808.

The device further includes:

A chrominance phase identification unit 810 connected to the identification unit 804 is configured to identify a phase of the chrominance modulated signal in the mode of the difference of 180 degrees alternatively between any two adjacent lines of the modulated signal; or to identify the phase of the chrominance modulated signal in the mode of Arctg phase discrimination.

The receiving unit 71 is further configured to receive a mixed signal over a coaxial cable and/or to receive management data over the coaxial cable, where the management data includes at least one of an identifier of a camera, an attribute of the camera and an alarm signal.

The device further includes: an audio and video separation unit 811 connected to the receiving unit 71 and the converting unit 72 and configured to filter the mixed signal received by the receiving unit 71 by using a predetermined filter band to obtain the analog video line signals and a frequency-modulated audio signal, to demodulate the frequency-modulated audio signal to obtain an audio signal, and to send the analog video line signals to the converting unit 72;

A modulation unit 812 configured to frequency-modulate digital control data by using a predetermined second frequency-modulation frequency to obtain analog control data, wherein the digital control data includes at least one of configuration parameters of the camera and an application strategy of the camera; and A sending unit 813 connected with the modulation unit 812 and configured to send the analog control data obtained by the modulation unit 812 over the coaxial cable.

Here the filter band is a frequency range different from a predetermined first frequency-modulation frequency by ±500 KHz, both the predetermined first frequency-modulation frequency and the predetermined second frequency-modulation frequency are frequencies in a range of 60 to 100 MHz, and a difference between the first frequency-modulation frequency and the second frequency-modulation frequency is at least 600 KHz.

The operating principle of the device illustrated in FIG. 8 is as described in the method in the third solution or the fourth solution above, so the repeated description thereof will be omitted here.

With the device as illustrated in FIG. 8, the received analog video signal with the high-definition characteristic is low-pass and band-pass filtered respectively to thereby separate the brightness signal and the chrominance signal effectively, and the brightness signal and the chrominance signal are digitized to obtain the high-definition digital video signal at the high resolution and high definition, so the image quality is higher than that of an image of a normal digital video signal.

Particular implementations of the embodiments of the invention will be described below.

(I) First Scenario

In this scenario, firstly the sending end encodes and sends high-definition digital video data, where the high-definition digital video data is in the format of 720P with 25 frames, each of which includes 3960×750 data points.

Step 1, processing the high-definition digital video signal by using the method as illustrated in FIG. 2, and particularly, converting each frame of data into 1600×750 points according to the step 21 to the step 22, where there are 320 points in the column direction in the blank area and 1280 points in the active area, and the sampling frequency is lowered from 74.25 MHz to 30 MHz;

Step 2, normalizing, for each line of data in the data frame, a brightness signal Y in the line of data to obtain a brightness modulated signal Y'; and determining component chrominance signals UV according to component data YCbCr based on the above equations (1) to (5), and determining a predetermined empirical frequency in the range of 13.5 to 21 MHz as a chrominance secondary carrier frequency fsc; and taking the chrominance secondary carrier frequency as the frequency of a chromatic synchronization signal, taking a clock cycle of at least ten 1/fsc as the cycle of the chromatic synchronization signal, and carrying information about the chrominance secondary carrier frequency fsc in the chromatic synchronization signal at a phase different from a reference phase by +135 degrees or −135 degrees alternatively;

Step 3, modulating orthogonally the component chromatic signals UV at the chrominance secondary carrier frequency fsc based on the above equation (6) to obtain a chrominance modulated signal C;

Step 4, superimposing the brightness modulated signal Y' and the chrominance modulated signal C to obtain a valid modulated signal Vs, particularly Vs=Y'+C;

Step 5, constructing a digital modulated line signal from a line synchronization header, the chromatic synchronization signal and the valid modulated signal Vs;

Step 6, performing analog quantization on the digital modulated line signal to obtain an analog video line signal Va, and particularly, performing the analog quantization on the digital modulated line signal at a conversion frequency greater than or equal to 108 MHz to obtain the 1280H analog video line signal Va;

Step 7, constructing an analog video frame signal from the constructed analog video line signals in an order of lines in the current data frame, and setting the initial phases of any two adjacent analog video data frames to be different from each other by 180 degrees; and Step 8, sending the constructed analog video line signals sequentially.

With the process flow described above, the high-definition digital video signal in the format of 702P with 25 frames is converted into the 1280H analog video signal with 25 frames having the high-definition characteristic.

At the receiving end, the received analog video signal is processed by using the method as illustrated in FIG. 5 to thereby decode and recover each frame of analog video signal into 1600×750 data points so as to recover the data sent from the sending end.

(II) Second Scenario

In this scenario, firstly the sending end encodes and sends high-definition digital video data, where the high-definition digital video data is in the format of 720P with 30 frames, each of which includes 3300×750 data points.

The high-definition digital video data in the format of 720P with 30 frames is processed based on the method in the first scenario described above by converting each frame of data into 1600×750 points as an intermediate data frame, where there are 320 points in the column direction in the blank area and 1280 points in the active area, and the sampling frequency is lowered from 74.25 MHz to 30 MHz. The intermediate data frame is processed to convert the high-definition digital video signal in the format of 720P with 30 frames into a 1280H analog video signal with 30 frames having the high-definition characteristic.

At the receiving end, the received analog video signal is processed by using the method as illustrated in FIG. 5 to thereby decode and recover each frame of analog video signal into 1600×750 data points so as to recover the high-definition digital video data sent from the sending end.

Figure 9:
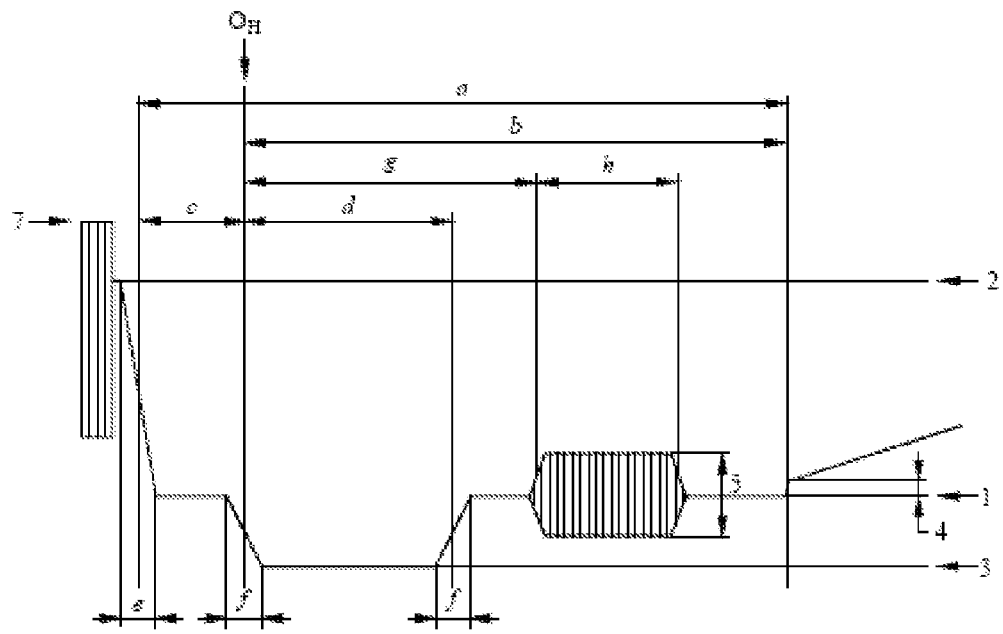
FIG. 9 is a schematic structural diagram of an analog video signal in a particular implementation of an embodiment of the invention.

FIG. 9 illustrates a schematic structural diagram of the analog video signal obtained in the first scenario and the second scenario, and Table 1 shows temporal characteristic parameters of the analog video signal corresponding to FIG. 9. As can be apparent from FIG. 9 and Table 1, the respective temporal characteristic parameters of the analog video signal are all superior to temporal characteristic parameters of an analog video signal specified in CVBS.

TABLE 1

| ID | Name | 1280H 25 frames | 1280H 30 frames |
|---|---|---|---|
| H | Line cycle | 53.33 us | 44.44 us |
| a | Line blank | 10.67 us | 8.89 us |
| b | (a − c) | 9.42 us | 7.89 us |
| c | Front shoulder | 1.25 us | 1.0 us |
| d | Synchronization pulse | 3.9 us | 3.3 us |
| e | Line blank rise time | 0.25 us | 0.2 us |
| f | Synchronization rise time | 0.17 us | 0.14 us |
| g | Line to burst time | 4.7 us | 3.9 us |
| h | Burst time | 2.29 us (40 cycles) | 2.0 us (40 cycles) |

Moreover, the 1080P high-definition digital video signal can also be sent by using the process flow in the first scenario and the second scenario as described above. For the high-definition digital video frame data in the format of 1080P with 25 frames, the data can be firstly converted into intermediate frame data with 2363×1125 points including 1940 points in the active area and 443 points in the blank area, then the intermediate frame data is encoded, and finally the analog quantification is performed on the encoded result at a conversion frequency of 66.45 MHz to obtain a 1920H analog video signal; or for the high-definition digital video frame data in the format of 1080P with 30 frames, the data can be firstly converted into intermediate frame data with 2363×1125 points including 1940 points in the active area and 443 points in the blank area, then the intermediate frame data is encoded, and finally the analog quantification is performed on the encoded result at a conversion frequency of 79.75 MHz to obtain a 1920H analog video signal.

Table 2 shows temporal characteristic parameters of the 1920H analog video signal into which the 1080P high-definition digital video signal is converted. As can be apparent from Table 2, the respective temporal characteristic parameters of the analog video signal are all superior to temporal characteristic parameters of an analog video signal specified in CVBS.

TABLE 2

| ID | Name | 1920H 25 frames | 1920H 30 frames |
|---|---|---|---|
| H | Line cycle | 35.56 us | 29.63 us |
| a | Line blank | 6.67 us | 5.56 us |
| h | Burst time | 40 cycles | 40 cycles |

19

(III) Third Scenario

The third scenario corresponds to the first scenario, and the receiving end receives a mixed signal, where the video signal in the mixed signal is the 1280H high-definition video analog signal obtained in the process flow in the first scenario.

Step 1, receiving a mixed signal;

Step 2, filtering the received mixed signal to obtain analog video line signals and an audio signal;

Step 3, performing an analog-to-digital converting operation on the analog video line signals to obtain digital modulated line signals; and Step 3, decoding the digital modulated line signals to obtain high-definition digital video line signals.

Where for the step 2 and the step 3, reference can be made to the above processing flow illustrated in FIG. 6.

Figure 10:
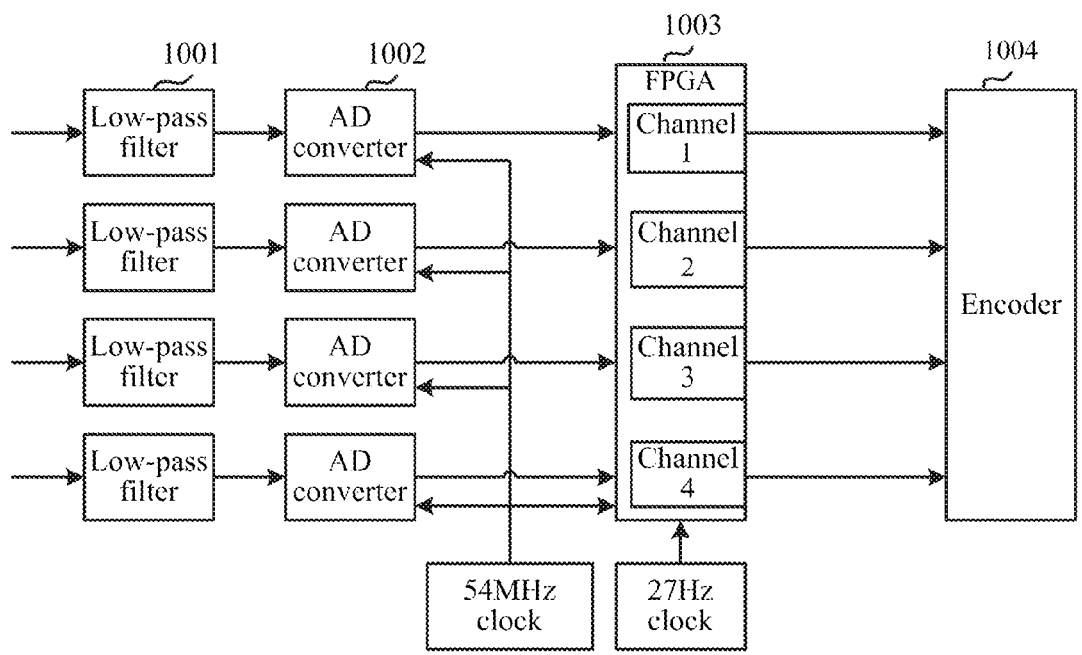
FIG. 10 is a structural block diagram of a particular implementation of a device for receiving a high-definition digital video signal according to an embodiment of the invention.

FIG. 10 illustrates a particular structure of a receiving end, and as illustrated in FIG. 10, the receiving end includes a low-pass filter 1001, an analog-to-digital converter 1002, an FPGA chip 1003 and an encoder 1004.

The low-pass filter 1001 with a filter range of 13.5 to 45 MHz performs low-pass filtering on the received mixed signal to obtain analog video line signals and an audio signal, and removes noise; the analog-to-digital converter 1002 performs analog-to-digital conversion on the analog video line signals by using a sampling clock of 54 MHz to obtain digital modulated line signals; the FPGA 1003 separates the multiple digital modulated line signals from the analog-to-digital converter 1002 by using a clock of 27 MHz, and sends the separated multiple digital modulated line signals to the encoder 1004 by using an output clock of 74.25 MHz respectively over different channels (e.g., channel 1 to channel 4); and the encoder 1004 converts the digital modulated line signals into high-definition digital video line signals.

With the process described above, the receiving end can split the mixed signal, and decodes and converts the analog video line signals to obtain the high-definition digital video line signals.

As can be apparent from the comparison of the first scenario with the third scenario, the sending end can convert the high-definition digital video signal into the analog video signal and send the analog video signal, and the receiving end can convert the received analog video signal into the high-definition digital video signal, so that the high-definition digital video signal can be transmitted for a long distance.

In summary, the sending end encodes and converts the high-definition digital video signal in the line-by-line sequence to obtain the analog video line signals, and sends the analog video line signals obtained by the encoding and converting operations; and the receiving end receives the analog video line signals, and converts and decodes the received analog video line signals to obtain the high-definition digital video line signals, so that the high-definition digital video signal can be converted into the analog video signal for transmission to thereby address the problem that the high-definition digital video signal can not be transmitted for a long distance in the existing high-definition digital video monitoring technology.

Those ordinarily skilled in the art can appreciate that all or a part of the steps in the methods according to the embodiments described above can be performed by program instructing relevant hardware, where the program can be stored in a computer readable storage medium, and the program can perform one or a combination of the steps in the method embodiments when being executed.

20

Moreover the respective functional units in the respective embodiments of the invention can be integrated in a processing module, or the respective units can be physically embodied separately, or two or more units can be integrated in a module. The integrated modules can be embodied in the form of hardware or can be embodied in the form of software functional modules. The integrated modules, if embodied in the form of software functional modules and sold or used as separate products, can also be stored in a computer readable storage medium.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A method for sending a high-definition digital video signal, comprising:
    encoding the high-definition digital video signal in a line-by-line sequence to obtain digital modulated line signals by, for each line of data of the high-definition digital video signal, determining a brightness modulated signal and a chrominance modulated signal in the line of data, superimposing the brightness modulated signal and the chrominance modulated signal to obtain a valid modulated signal, and constructing a digital modulated line signal from a line synchronization header, a chromatic synchronization signal and the valid modulated signal;

converting the digital modulated line signals into analog video line signals; and sending the analog video line signals.

2. The method according to claim 1, wherein for each line of data of the high-definition digital video signal, determining the brightness modulated signal includes normalizing a brightness signal in the line of data to obtain the brightness modulated signal, and determining the chrominance modulated signal includes:

determining component chrominance signals according to component chromatic aberration signals in the line of data;

determining a chrominance secondary carrier and carrying information about the chrominance secondary carrier in a chromatic synchronization signal; and determining the chrominance modulated signal according to the component chrominance signals and the chrominance secondary carrier.

3. The method according to claim 2, wherein determining the chrominance secondary carrier specifically comprises:

determining a chrominance secondary carrier frequency in a predetermined frequency range higher than a frequency range of a video baseband signal and in a predetermined bandwidth range, wherein the frequency range of the video baseband signal includes: a frequency range from 0 to 15 MHz of a video baseband signal for the high-definition digital video signal in a 720p format and a frequency range from 0 to 32 MHz of a video baseband signal for the high-definition digital video signal in a 1080p format; the predetermined frequency range for the high-definition digital video signal in the 720p format is from 13.5 to 21 MHz, and the predetermined frequency range for the high-definition digital video signal in the 1080p format is from 20 to 45 MHz; and the predetermined bandwidth of the chrominance secondary carrier for the high-definition digital video signal in the 720p format is from 4 to 6 MHz, and the predetermined bandwidth of the chrominance secondary carrier for the high-definition digital video signal in the 1080p format is from 8 to 14 MHz; and determining the chrominance modulated signal according to the component chrominance signals and the chrominance secondary carrier specifically comprises: modulating orthogonally the component chrominance signals at the chrominance secondary carrier frequency to obtain the chrominance modulated signal.

4. The method according to claim 3, wherein determining the chrominance secondary carrier frequency in the predetermined frequency range higher than the frequency range of the video baseband signal specifically comprises:

determining randomly a frequency in the predetermined frequency range higher than the frequency range of the video baseband signal as the chrominance secondary carrier frequency; or determining a predetermined empirical frequency in the predetermined frequency range as the chrominance secondary carrier frequency.

5. The method according to claim 2, wherein carrying the information about the chrominance secondary carrier in the chromatic synchronization signal specifically comprises:

taking the chrominance secondary carrier frequency as a frequency of the chromatic synchronization signal, and taking a clock cycle of at least ten 1/fsc as a cycle of the chromatic synchronization signal, wherein fsc is the determined chrominance secondary carrier frequency.

6. The method according to claim 2, wherein carrying the information about the chrominance secondary carrier in the chromatic synchronization signal specifically comprises:

taking a phase different from a reference phase by +135 degrees or −135 degrees alternatively as a phase of the chromatic synchronization signal between any two adjacent lines of data;

determining the chrominance modulated signal according to the component chrominance signals and the chrominance secondary carrier specifically comprises:

modulating orthogonally the component chrominance signals by alternatively using $C=U \sin(2\pi^* fsc)+V \cos(2\pi^* fsc)$ or $C=U \sin(2\pi^* fsc)-V \cos(2\pi^* fsc)$ between any two adjacent lines of data to obtain the chrominance modulated signal, wherein C is the chrominance modulated signal, U is a blue component chrominance signal among the component chrominance signals, V is a red component chrominance signal among the component chrominance signals, and fsc is the determined chrominance secondary carrier frequency; and the method further comprises:

for analog video data frames formed of several analog video line signals, setting initial phases of any two adjacent ones of the analog video data frames to be different from each other by 180 degrees.

7. The method according to claim 2, wherein determining the chrominance modulated signal according to the component chrominance signals and the chrominance secondary carrier specifically comprises:

modulating orthogonally the component chrominance signals by using $C=U \sin(2\pi^* fsc)+V \cos(2\pi^* fsc)$ to obtain the chrominance modulated signal, wherein C is the chrominance modulated signal, U is a blue component chrominance signal among the component chrominance signals, V is a red component chrominance signal among the component chrominance signals, and fsc is the determined chrominance secondary carrier frequency.

8. The method according to claim 2, wherein converting the digital modulated line signals into the analog video line signals specifically comprises: performing analog quantization on the digital modulated line signals at a conversion frequency greater than or equal to 80 MHz to obtain the analog video line signals.

9. The method according to claim 2, further comprising: reserving, for a current high-definition digital video data frame to be processed, data points in an active data area and a part of data points in a column direction in a blank area in the data frame to obtain an intermediate data frame; and encoding the high-definition digital video signal in the line-by-line sequence to obtain the digital modulated line signals specifically comprises: encoding each line of data in the active data area in the intermediate data frame to obtain a digital modulated line signal.

10. The method according to claim 9, further comprising: predetermining, according to a transmission period of time for transmitting the line synchronization header and the chromatic synchronization signal, the amount of data, in the column direction in the blank area, which can be transmitted in the transmission period of time, and taking the determined amount of data as the amount of reserved data; and reserving a part of the data points in the column direction in the blank area in the data frame specifically comprises: reserving data points, of which the amount is equal to the predetermined amount of reserved data, in the column direction in the blank area in the current data frame according to the amount of reserved data.

11. The method according to claim 9, wherein sending the analog video line signals obtained by the encoding and converting operations specifically comprises:

replacing the line synchronization header and the data points in the blank area in the analog video line signals with a direct-current level analog signal at a predetermined level amplitude; and sending the replaced analog video line signals.

12. The method according to claim 1, further comprising:

frequency-modulating an audio signal at a predetermined first frequency-modulation frequency to obtain a frequency-modulated audio signal, superimposing the frequency-modulated audio signal and the analog video line signals to obtain a mixed signal, and sending the mixed signal over a coaxial cable; and/or sending management data over the coaxial cable in a radio data broadest system, wherein the management data includes at least one of an identifier of a camera, an attribute of the camera and an alarm signal; and/or receiving analog control data from a video acquisition device over the coaxial cable, filtering and demodulating the analog control data by using a predetermined filter band to obtain digital control data, and storing and/or configuring the digital control data, wherein the digital control data includes at least one of configuration parameters of the camera and an application strategy of the camera;

wherein the filter band is a frequency range different from a predetermined second frequency-modulation frequency by ±100 KHz, both the predetermined first frequency-modulation frequency and the predetermined second frequency-modulation frequency are frequencies in a range of 60 to 100 MHz, and a difference between the first frequency-modulation frequency and the second frequency-modulation frequency is at least 600 KHz.

* * * * *